(12) United States Patent
Guerry et al.

(10) Patent No.: US 8,899,214 B2
(45) Date of Patent: Dec. 2, 2014

(54) EXHAUST GAS RECIRCULATION DEVICE FOR AN INTERNAL COMBUSTION ENGINE

(75) Inventors: Pascal Guerry, Seppois le Bas (FR); Hervé Martinengo, Chilly (FR); Moïse Dominguez, Bourg en Bresse (FR); Paul Ferrey, Champfromier (FR)

(73) Assignee: MGI Coutier (FR)

( * ) Notice: Subject to any disclaimer, the term of this patent is extended or adjusted under 35 U.S.C. 154(b) by 1217 days.

(21) Appl. No.: 12/667,574

(22) PCT Filed: Jun. 27, 2008

(86) PCT No.: PCT/FR2008/000916
§ 371 (c)(1),
(2), (4) Date: Oct. 15, 2010

(87) PCT Pub. No.: WO2009/016294
PCT Pub. Date: Feb. 5, 2009

(65) Prior Publication Data
US 2011/0041817 A1 Feb. 24, 2011

(30) Foreign Application Priority Data

Jul. 2, 2007 (FR) ..................................... 07 04759

(51) Int. Cl.
*F02M 25/07* (2006.01)
*F02M 29/06* (2006.01)
*F02M 35/10* (2006.01)

(52) U.S. Cl.
CPC ........... *F02M 25/0722* (2013.01); *F02M 29/06* (2013.01); *F02M 35/10124* (2013.01); *F02M 35/10222* (2013.01); *F02M 35/10262* (2013.01); *F02M 25/0703* (2013.01); *Y02T 10/121* (2013.01); *Y02T 10/146* (2013.01)
USPC ..................................... 123/568.17; 123/590

(58) Field of Classification Search
CPC .......... F02M 25/0703; F02M 25/0722; F02M 29/08; F02M 29/06; F02M 29/04; F02M 35/10124; F02M 35/10222; F02M 35/10262; Y02T 10/121; Y02T 10/146
USPC .................. 123/568.17, 184.21, 590, 568.18; 366/174.1, 338, 343; 239/601; 454/154–155
See application file for complete search history.

(56) References Cited

U.S. PATENT DOCUMENTS 1,931,729 A * 10/1933 Kitchen ......................... 123/546
4,192,273 A * 3/1980 Gray .............................. 123/590
(Continued)

FOREIGN PATENT DOCUMENTS

DE 198 57 577 7/1999
DE 199 45 769 3/2001
FR 2 861 137 4/2005
(Continued)

OTHER PUBLICATIONS
International Search Report; PCT/FR2008/000916; Jan. 28, 2009.

*Primary Examiner* — Erick Solis
*Assistant Examiner* — Carl Staubach
(74) *Attorney, Agent, or Firm* — Cantor Colburn LLP

(57) ABSTRACT

A recirculation device includes an air intake duct (3) which is followed by a manifold (6), means for introducing recycled exhaust gases, for mixing same with the fresh air let in. This device is designed to inject the exhaust gases by forming two counter-rotating adjacent vortices (14, 15), owing to a twin tubular mixer nozzle (10, 11) in communication with a common exhaust gas supply duct, positioned tangentially with respect to the two nozzles, placed side by side. The two vortices (14, 15) are self-sustaining to the outlets (7) of the manifold (6). Such a recirculation device is applied, in particular, to an air intake duct (3) of oblong cross section and/or to a manifold (6) with a flattened inlet (5) and/or a flattened plenum (8), in particular for a motor vehicle engine.

12 Claims, 6 Drawing Sheets

(56) References Cited

U.S. PATENT DOCUMENTS

| | | | |
|---|---|---|---|
| 5,388,559 A * | 2/1995 | O'Keefe | 123/593 |
| 5,685,281 A * | 11/1997 | Li | 123/590 |
| 6,427,671 B1 * | 8/2002 | Holze et al. | 123/568.17 |
| 6,889,673 B2 * | 5/2005 | Bender et al. | 123/568.17 |
| 7,140,357 B2 * | 11/2006 | Wei et al. | 123/568.17 |
| 2004/0079347 A1 | 4/2004 | Bender et al. | |

FOREIGN PATENT DOCUMENTS

| | | |
|---|---|---|
| FR | 2 871 530 | 12/2005 |
| FR | 2 907 513 | 4/2008 |
| WO | 2005/090773 | 9/2005 |

* cited by examiner

EXHAUST GAS RECIRCULATION DEVICE FOR AN INTERNAL COMBUSTION ENGINE

TECHNICAL FIELD

The present invention relates to an exhaust gas recirculation device for an internal combustion engine, such as a motor vehicle engine in particular, a device such as this also being known by the abbreviated name of EGR (for exhaust gas recirculation).

BACKGROUND

In present-day internal combustion engines it is commonplace for hot exhaust gases to be introduced into an air inlet duct at various phases of engine operation according to the speed and load in order to reduce the pollution. The exhaust gases are introduced downstream of the "butterfly" housing in the case of gasoline engines and downstream of the "metering" housing in the case of diesel engines. In all cases, the recirculated gases have to spread uniformly into each cylinder of the engine concerned, because each cylinder has to receive the same amount of external fresh air and of exhaust gas.

Usually, the air inlet system of an internal combustion engine comprises an air inlet duct, of circular or some other cross section, and a multiple-outlet manifold which follows on from the air inlet duct and which guides the air toward the various cylinders. In this context, the problem is that of introducing the exhaust gases into the air inlet duct in such a way that these gases form a uniform mixture with the admitted air before they enter the manifold.

To this end, one solution already proposed by the Applicant, which has been the subject of a French patent application no. 06/09181 filed on Oct. 19, 2006 and published under the number 2907513 on Apr. 25 2008, is to introduce the exhaust gases tangentially into a tubular mixing nozzle positioned in the air inlet duct coaxially with the latter and with the inlet to the manifold. A configuration configuration such as this in theory allows the exhaust gases to mix with the fresh air quickly and therefore over a short path, creating a swirling vortex in the mixing nozzle and in the downstream part of the inlet duct just before the mixture enters the manifold, and does so while at the same time thermally insulating the recirculated hot gases with a layer of fresh air surrounding the swirling vortex.

This solution is simple and has proved effective and adequate in a great many applications, that is to say for numerous known configurations of inlet duct and inlet manifold. However, it does prove to be defective or insufficient for some duct and manifold geometries, as specified hereinafter.

Hence, in the case of an air inlet duct of circular cross section, and with a manifold of which the inlet and the plenum are also of circular cross section, the swirling vortex created by the tubular mixing nozzle is maintained in the plenum before it reaches the various branches of the manifold, thus ensuring uniform distribution of the mixture.

However, some inlet ducts are not of circular cross section but have an oblong cross section. In such cases, the swirling vortex leaving the tubular mixing nozzle is rapidly destroyed because it is not contained by an external envelope of circular cross section. The mixing of the exhaust gases with the air is therefore far less effective and less uniform, and the distribution to the engine cylinders, which is performed downstream of this point, may be adversely affected.

Similarly, some manifolds have a flattened inlet and a flattened plenum. In such cases, the jet of exhaust gas leaving the mixing nozzle no longer swirls like a vortex but has a tendency to "stick" to the wall of the manifold, on one side of this manifold or the other. An asymmetric phenomenon such as this obviously impairs the distribution of the mixture between the cylinders.

French patent application 2871530 provides, for the exhaust gas recirculation of an internal combustion engine, a dual intake of these gases, on each side of the air inlet duct. Two symmetrical gas streams are thus injected into the inlet duct, at two distinct points, these mutually opposing gas streams colliding with one another, thereby dissipating some of their energy before, in the inlet duct, forming two adjacent contrarotating swirling vortexes, that is to say vortexes that rotate in opposite directions to one another.

This known embodiment still has disadvantages:
  By its very principle, it gives rise to a loss in kinetic energy of the recirculated gases at the point where the two swirling vortexes are created, even though these vortexes succeed in retaining a maximum amount of energy to reach the manifold.
  The two swirling vortexes are not individually confined and guided and simply develop throughout the circular cross section of the inlet duct, coming into direct contact with the wall of the air inlet duct, which thus runs the risk of becoming excessively heated.
  Following on from the above point, the solution of that document in question is not intended for inlet ducts of oblong or flattened cross section.
  Finally, the need to have two injection orifices for the recirculated gases, and two separate pipes for carrying these gases as far as the two injection points, makes the structure and manufacture of the device more complicated.

BRIEF SUMMARY

The present invention aims to remedy the abovementioned disadvantages, and is configured to eliminate the shortfalls of homogeneity of the mixing between the exhaust gases and the air, particularly in the case of inlet ducts of oblong cross section and of manifolds with flattened inlet and/or flattened plenum, while at the same time retaining the advantages of devices that create swirling vortexes, using a technical solution that is simple in its structure and manufacture and allows all of the kinetic energy of the exhaust gases to be put to good use while at the same time preserving the wall of the inlet duct.

To this end, the subject of the invention is an exhaust gas recirculation device for an internal combustion engine, and more particularly a recirculation device comprising, inside an air inlet duct which is followed by a manifold with numerous outlets, means for introducing recirculated exhaust gases creating a swirling flow of these gases so that they mix with the admitted fresh air upstream of the inlet of the manifold, particularly for an air inlet duct of oblong section and/or a manifold with a flattened inlet and/or a flattened plenum, the device being designed to inject the exhaust gases such that they form two adjacent contrarotating swirling vortexes which self-sustain as far as the outlets of the manifold, this recirculation device being essentially characterized in that it comprises a double tubular mixing nozzle in the form of two complete or incomplete tubular nozzles positioned side by side and symmetrically inside the air inlet duct, and a single exhaust gas carrying pipe common to the two tubular mixing nozzles, this common carrying pipe being situated in the plane of symmetry of the two mixing nozzles.

In one embodiment of the invention, the exhaust gas recirculation device comprises a double tubular mixing nozzle which is in direct communication with the common exhaust gas carrying pipe, positioned tangentially with respect to the two tubular nozzles placed side by side.

Thus, the inventive step is to inject the exhaust gases, from a single injection point, into two adjacent tubular elements simultaneously in order to create two vortexes swirling in opposite directions which self-sustain in the air inlet duct, notably if this duct has an oblong cross section which, on the whole, corresponds to the envelope of the two tubular elements side by side. The two swirling vortexes extend into the manifold, as far as the outlets thereof, and interact, driving and balancing one another.

The two tubular mixing nozzles may have axes parallel to one another and to the central axis of the air inlet duct. However, it is possible for the two contrarotating swirling vortexes to be guided more accurately particularly by having the two tubular mixing nozzles have divergent axes, which also form an angle with the central axis of the air inlet duct. This in particular makes it possible to create two divergent swirling vortexes approximately corresponding with the flattened and flared plenum of the manifold, the risk of "sticking" to just one side of the manifold thus being excluded.

The structure and assembly of the recirculation device according to the invention remain simple because the tangential pipe carrying the exhaust gases remains a single pipe common to the two tubular mixing nozzles and because, in addition, this common exhaust gas carrying pipe may be formed as one piece with the double tubular mixing nozzle. This piece can be fixed to the air inlet duct by means of an annular fixing skirt, for example a welded one, which connects the exterior wall of the common exhaust gas carrying pipe to the exterior wall of the air inlet duct.

To simplify and further lighten the structure of the device, the two tubular mixing nozzles may each be the result of a substantially semi-cylindrical deflecting wall, this double deflecting wall being positioned facing the mouth of the common exhaust gas carrying pipe, an "incomplete" tubular configuration such as this also being able to create two contrarotating swirling vortexes. In this case, the two semi-cylindrical deflecting walls attached to one another but unattached to the common exhaust gas carrying pipe have to be connected to the interior wall of the air inlet duct by means of fixing lugs. This alternative form of embodiment makes for ease of manufacture, it being possible for the two substantially semi-cylindrical deflecting walls to be produced from one single sheet that has been suitably bent and folded, while at the same time reducing the pressure drops suffered by the fresh air flow. The fixing lugs, of which there are two or three, advantageously comprise on their exterior edge retaining claws designed to cling to the interior wall of the air inlet duct.

Additional arrangements will make manufacturing and assembling the device that forms the subject of the invention easier still:

The assembly comprising the two semi-cylindrical deflecting walls and the fixing lugs is produced from one and the same bent and folded sheet.

This assembly is made easier to fit by putting its elasticity to good use, this elasticity being the result of the fact that it is made of sheet metal and the result of its shape, the elastic stress to which this assembly is subjected fixing it inside the air inlet duct.

Thus, overall, the invention provides an exhaust gas recirculation device which not only improves the homogeneity of the mixing of these gases with the admitted fresh air, but which additionally is simple and economical to manufacture and to assemble and does not give rise to energy losses.

BRIEF DESCRIPTION OF THE DRAWINGS

The invention will be better understood with the aid of the description which follows, with reference to the attached schematic drawing which, by way of examples, depicts a number of embodiments of this exhaust gas recirculation device for an internal combustion engine.

DETAILED DESCRIPTION

Figure 1:
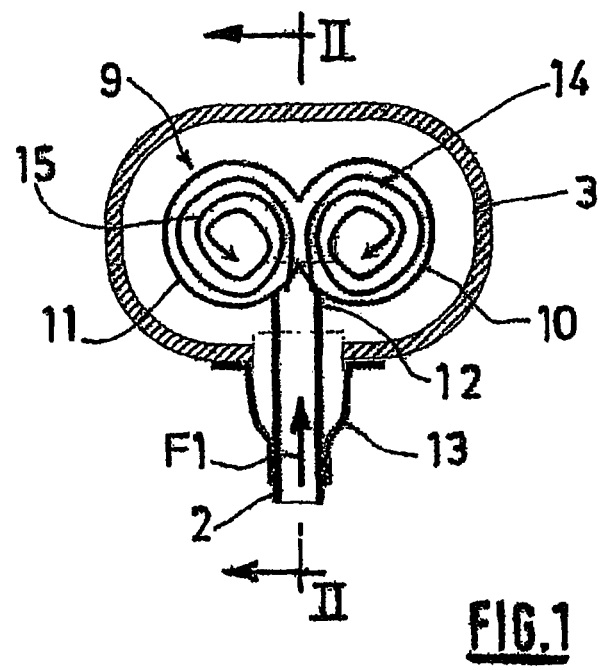
FIG. 1 is a cross section on I-I of FIG. 2, of an exhaust gas recirculation device according to the present invention.
Figure 2:
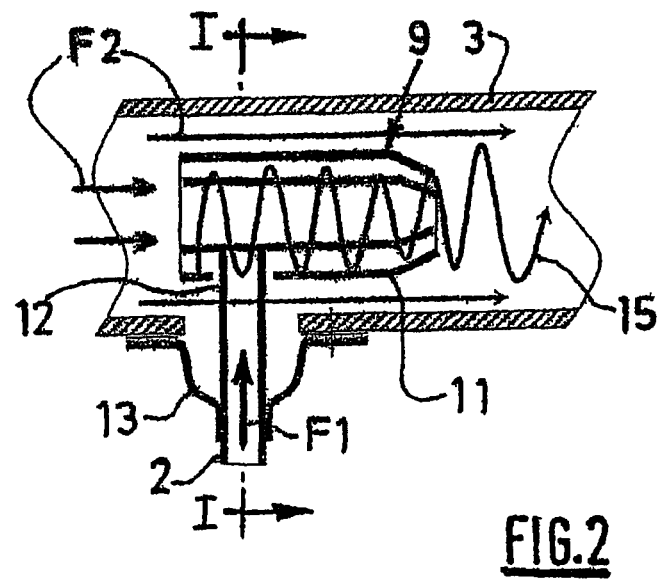
FIG. 2 is a longitudinal section on II-II of FIG. 1, of this recirculation device.
Figure 3:
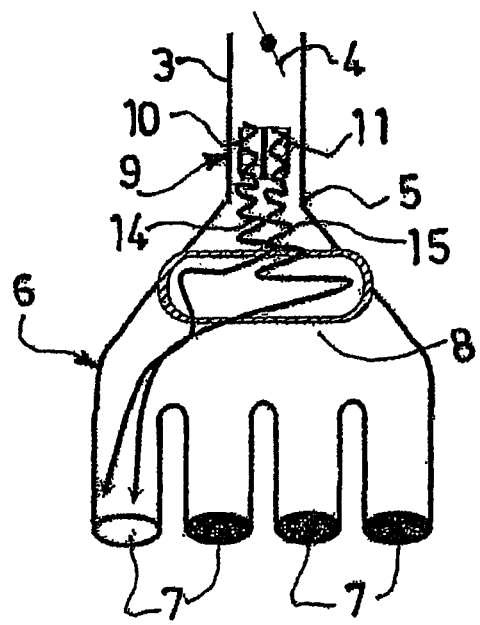
FIG. 3 is a diagram illustrating the application of the recirculation device of FIGS. 1 and 2 to a manifold with a flattened inlet.

In the exhaust gas recirculation device depicted schematically in FIGS. 1 to 3, the hot exhaust gases from an internal combustion engine are bled from an exhaust manifold (not depicted) by a pipe 2 which carries them to a fresh air inlet duct 3 of the internal combustion engine, downstream of an air intake flap 4 and upstream of the inlet 5 of a manifold 6 that has numerous outlets 7, for example four outlets, which follows on from the air inlet duct 3. The exhaust gases, arriving in the direction of the arrow F1, are thus mixed with some of the admitted fresh air flow, symbolized by the arrows F2, and the mixture created is directed, by the manifold 6, to the various cylinders of the engine concerned. More particularly, in the exemplary application illustrated here, the air inlet duct 3 has an oblong cross section, as visible in FIG. 1, and accordingly the manifold 6 has an inlet 5 and a plenum 8 both of flattened shape, as symbolized by the cross section indicated as an overlay in FIG. 3.

In order to suit such flattened or oblong cross sections, the recirculation device of the invention, denoted overall by the reference 9, comprises two tubular mixing nozzles 10 and 11 positioned side by side and symmetrically inside the air inlet duct 3, facing the mouth 12 of the exhaust gas carrying pipe 2.

The two mixing nozzles 10 and 11 here are arranged with their axes mutually parallel and parallel to the central axis of the air inlet duct 3, while the exhaust gas carrying pipe 2 is situated in the plane of symmetry of the two mixing nozzles 10 and 11 and opens tangentially to these two mixing nozzles 10 and 11 to which it is coupled.

More particularly, the end part of the exhaust gas carrying pipe 2 may support the two tubular mixing nozzles 10 and 11, the pipe 2 itself being held by means of an annular fixing skirt 13 which connects the exterior wall of this pipe 2 to the exterior wall of the air inlet duct 3. In an embodiment made in metal, the annular fixing skirt 13 may be welded to the exhaust gas carrying pipe 2.

When the internal combustion engine concerned is in operation, the hot combustion gases carried by the pipe 2 in the direction of the arrow F1 spread equally into the two tubular mixing nozzles 10 and 11 in which they arrive tangentially, then these gases are guided in a circle against the interior walls of these nozzles 10 and 11, being driven forward by some of the fresh air flow F2. In this way, the exhaust gases form, inside the two tubular nozzles 10 and 11, two contrarotating swirling vortexes 14 and 15, while at the same time mixing with the fresh air. These two swirling vortexes 14 and 15 of exhaust gases continue, through an inertial effect, beyond the nozzles 10 and 11 as far as the inlet 5 and the plenum 8 of the manifold 6. A homogenous mixture of admitted fresh air and of hot exhaust gases is thus obtained, this mixture being directed toward the outlet 7 of the manifold 6 which, at the relevant moment, feeds into one cylinder of the engine (the outlet situated farthest to the left in the case of FIG. 3). It will also be noted that, in this operation, the two contrarotating swirling vortexes 14 and 15 are surrounded by a layer of fresh air and do not come into contact with the wall of the air inlet duct 3.

Figure 4:
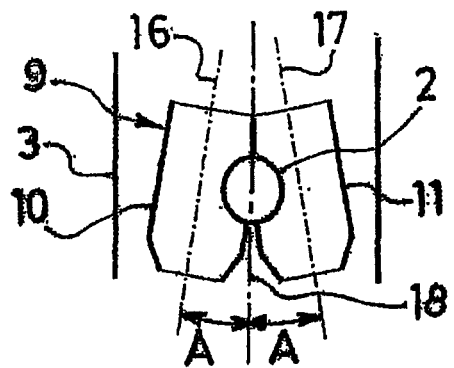
FIG. 4 is another diagram illustrating, by way of an alternative, a divergent arrangement of the two tubular mixing nozzles of the recirculation device.

FIG. 4 depicts an alternative form of the recirculation device 9, in which form the two tubular mixing nozzles 10 and 11, still positioned side by side inside the air inlet duct 3, have divergent axes 16 and 17 respectively, that is to say axes which diverge in the downstream direction and which also each make an acute angle A with the central axis 18 of the air inlet duct 3. The two contrarotating swirling vortexes created by the tubular nozzles 10 and 11 are thus divergent and can be better distributed in the flattened inlet and flattened plenum of the manifold (not depicted here).

Figure 5:
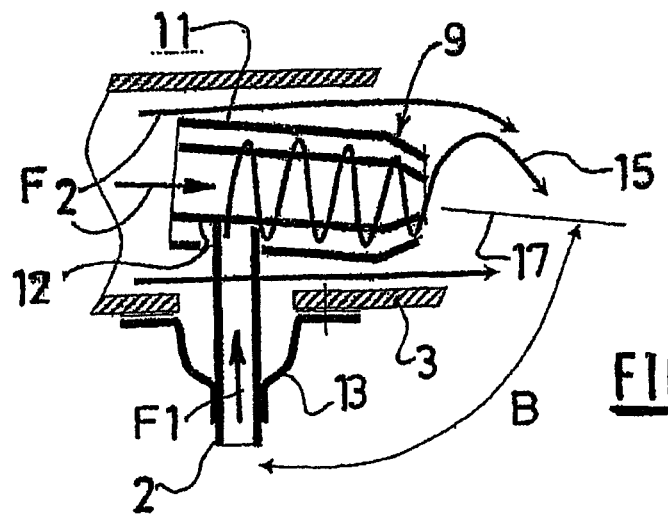
FIG. 5 is a cross section similar to FIG. 1, illustrating another way of inclining the tubular nozzles.

As illustrated by FIG. 5, it is also possible for the tubular mixing nozzles, such as the nozzle 11, to be inclined differently for example by having the axis 17 of this nozzle 11 form an angle B less than 90° with the axis of the exhaust gas carrying pipe 2.

Figure 6:
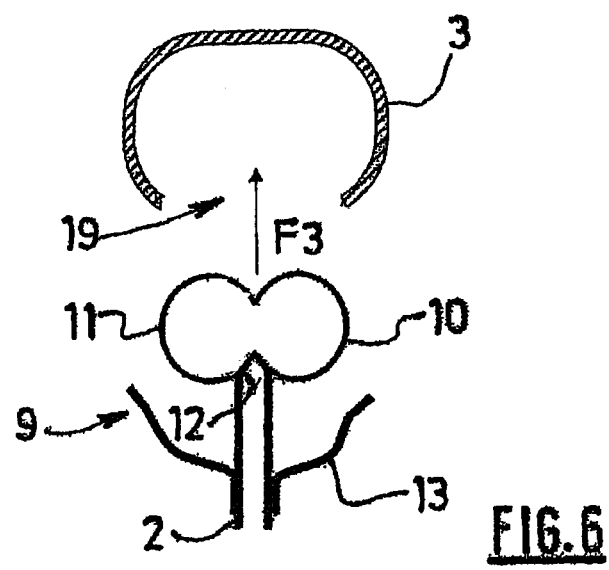
FIG. 6 is a cross section illustrating one particular embodiment and assembly of the recirculation device, particularly of its tubular mixing nozzles.

With reference to FIG. 6 which relates to one particular embodiment and assembly of the recirculation device 9, the exhaust gas carrying pipe 2 and the two tubular mixing nozzles 10 and 11 side by side are advantageously formed as a single piece, fitted inside the air inlet duct 3 which is provided with a lateral opening 19 that is long and wide enough to introduce the double tubular nozzle 10, 11 (in the direction of the arrow F3). This single piece is itself fixed to the air inlet duct 3 by the annular fixing skirt 13, welded air-tightly to the edge of the opening 19 so as to close off this opening 19.

Figure 7:
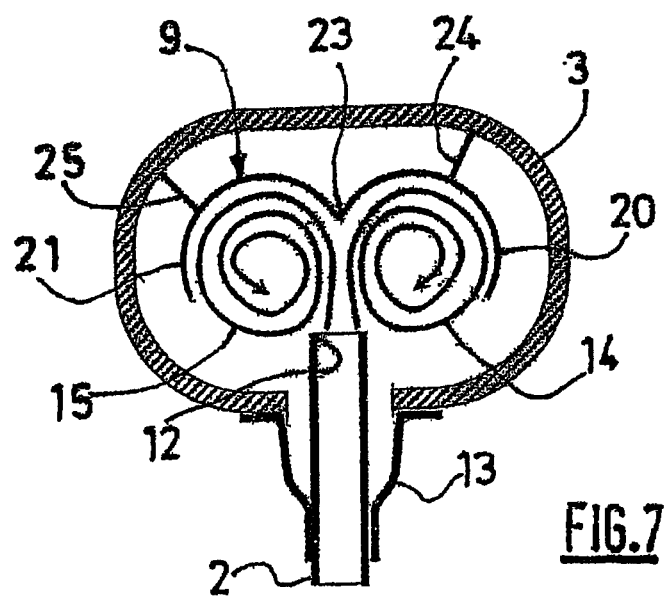
FIG. 7 is a cross section of another embodiment of the recirculation device according to the invention, with two semi-cylindrical deflecting walls.

FIG. 7 et seq. illustrate other embodiments of the recirculation device 9 according to the invention, in which the two tubular mixing nozzles which are full nozzles, that is to say of cylindrical overall appearance, are respectively replaced by two semi-cylindrical deflecting walls 20 and 21 which are positioned symmetrically in the air inlet duct 3 facing the mouth 12 of the exhaust gas carrying pipe 2. The fact of the matter is that it has been found that such deflecting walls 20 and 21, each of which in some way represents half a full tubular mixing nozzle (according to the preceding figures), are enough to create two self-sustaining contrarotating swirling vortexes 14 and 15 at the outlet of the recirculation device 9.

In this configuration, the two deflecting walls 20 and 21 are separate from the exhaust gas carrying pipe 2. This pipe 2 can still be connected to the air inlet duct 3 by an annular fixing skirt 13 (see FIGS. 7 and 9), while the assembly formed by the two deflecting walls 20 and 21 has to be fixed inside the air inlet duct 3 by special means detailed hereinafter.

Figure 8:
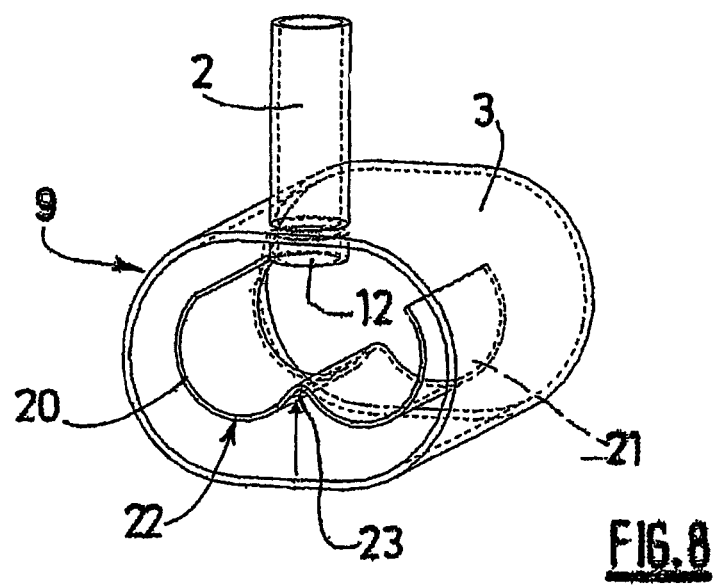
FIG. 8 is a view in perspective (not depicting the fixing means) of the recirculation device of FIG. 7.

As shown by FIG. 8, the two semi-cylindrical deflecting walls 20 and 21 may come from one and the same metal plate 22, initially rectangular, which is bent symmetrically to form the two semi-cylindrical parts and then folded at its middle, where the two semi-cylindrical parts meet, the profile obtained being likenable to an "ω". The central fold 23 of the plate 22 is rounded with a suitable radius, given the constraints involved in sheet metal bending.

The means of fixing the assembly formed of the two deflecting walls 20 and 21 comprise fixing lugs, which connect this assembly to the interior wall of the air inlet duct 3. The fixing lugs may be two in number, as shown by FIG. 7, with two substantially symmetric lugs 24 and 25 projecting respectively from the two deflecting walls 20 and 21. There may also be three of these lugs, with, in addition, a central fixing lug 26 projecting from the central fold 23—see FIG. 9 et seq.

Figure 9:
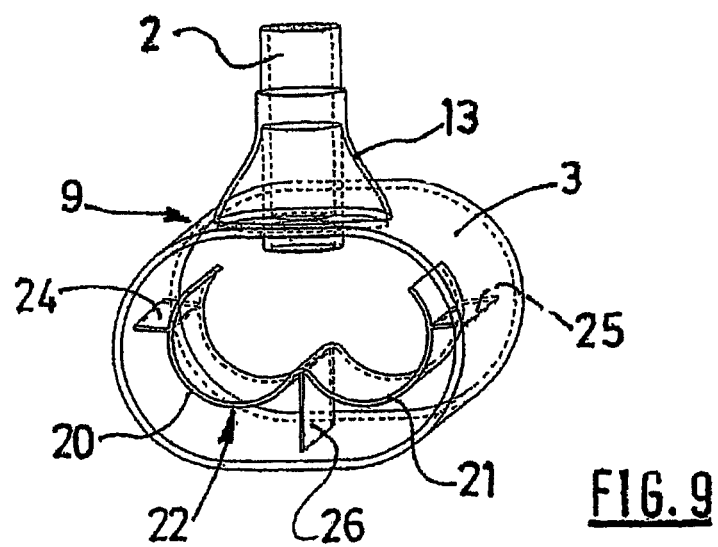
FIG. 9 is a perspective view similar to FIG. 8, showing a special arrangement of the fixing means.
Figure 10:
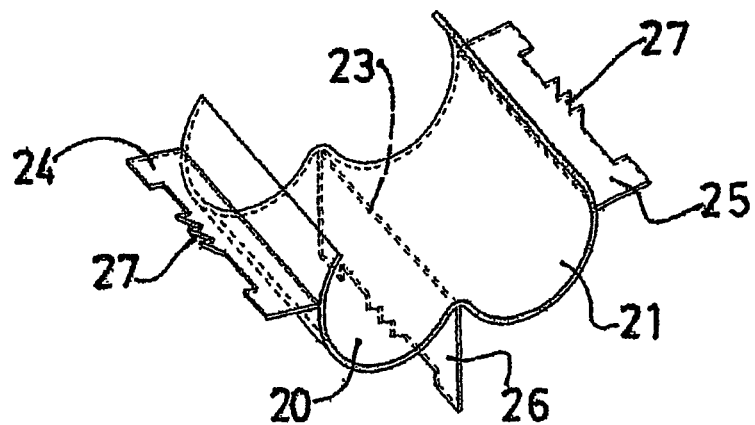
FIG. 10 is a perspective view in greater detail showing the assembly formed by the semi-cylindrical double deflecting wall and the fixing lugs.

As shown more specifically in FIG. 10, each of the fixing lugs 24, 25 and 26 may comprise, on its exterior edge, retaining claws 27 which are designed to cling to the interior wall of the air inlet duct 3 (see also FIG. 9).

Figure 11:
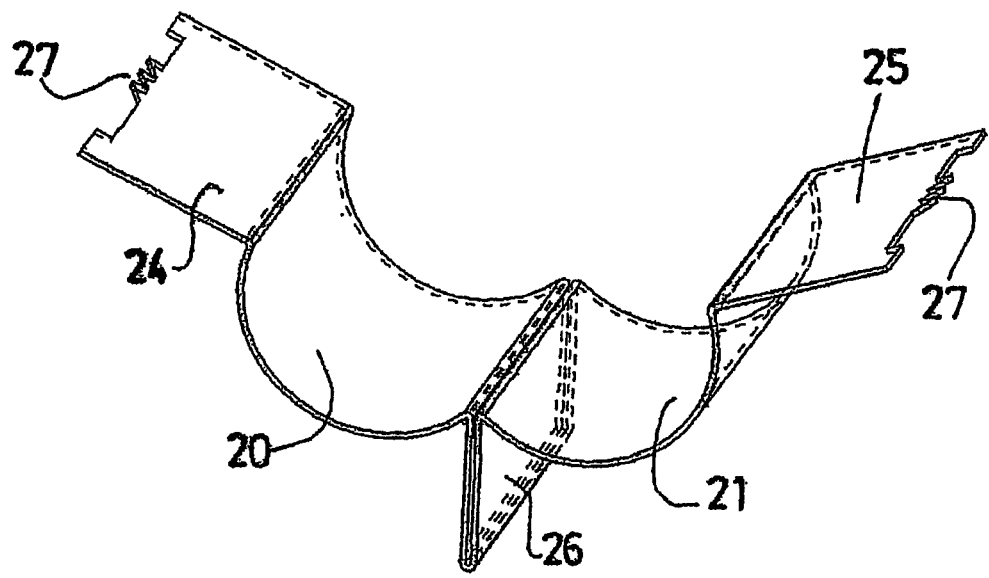
FIG. 11, again in perspective, illustrates an alternative form of this assembly formed of the double deflecting wall and of the fixing lugs.

The assembly comprising the two semi-cylindrical deflecting walls 20 and 21 and of the three fixing lugs 24, 25 and 26 may be made as a single piece, from one and the same sheet suitably cut, bent and folded, as illustrated in FIG. 11. The two symmetric lugs 24 and 25 situated at the ends of the deflecting walls 20 and 21 respectively, come from folding the sheet at right angles. The central fixing lug 26 is the result of a triple "W" folding performed at the middle of the sheet.

Figure 12:
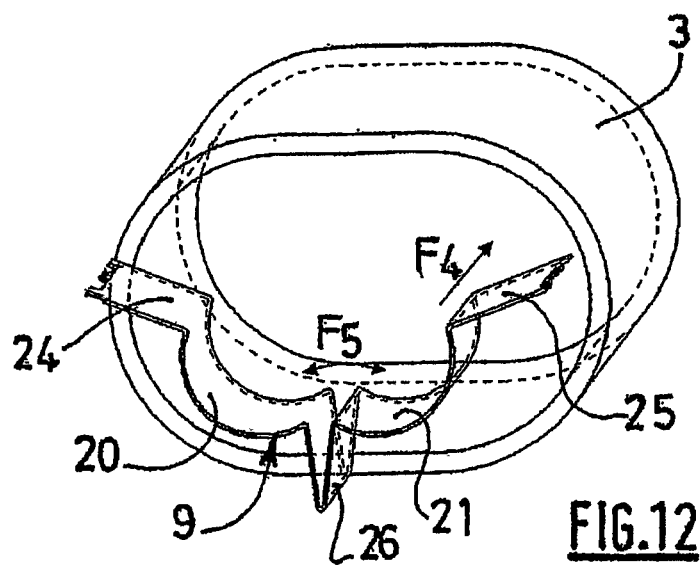
FIG. 12 is a diagram illustrating the fitting of the assembly according to FIG. 11 in the air inlet duct.

It will be noted that this last embodiment, as illustrated by FIG. 12 for the assembly considered here, can be force-fitted in the direction of the arrow F4 and holds in place in the air inlet duct 3 as a result of the elasticity of the sheet, the elastic stresses in the sheet tending to push the two flanks of the central lug 26 apart, and therefore also tending to push the two end lugs 24 and 25 apart, as suggested by the double-headed arrow F5. Thus, the retaining claws 27 of the end lugs 24 and 25 cling to the rounded parts of the wall of the air inlet duct 3, while the central lug 26 is pressed against the flat bottom of this wall.

Figure 13:
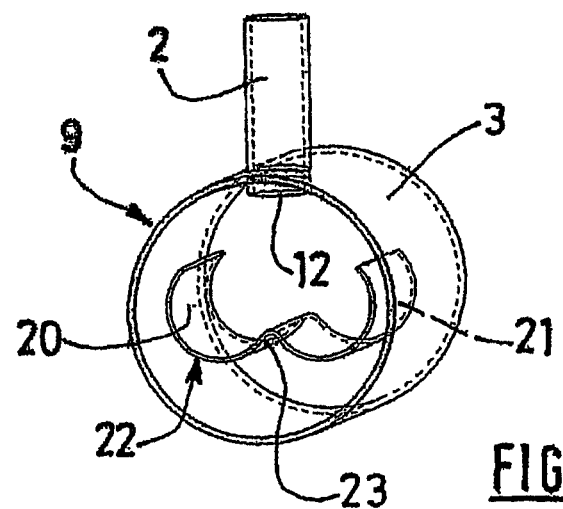
FIG. 13 is a perspective diagram (not depicting the fixing means) illustrating how an assembly according to the preceding figures is mounted in an air inlet duct of circular cross section.

Finally, as shown by FIG. 13, a recirculation device 9 as previously described, for example a device with a semi-cylindrical double deflecting wall 20, 21, may also be mounted in an air inlet duct 3 of circular cross section, retaining the advantages of the previously mentioned fixing means (means which, in order to make the drawing more clear, have not been depicted here).

The following would not constitute departures from the scope of the invention as defined in the attached modifying the embodiment details of the device, particularly the details of the double tubular mixing nozzle or of the semi-cylindrical double deflecting wall;

modifying the number of fixing lugs, or resorting to other fixing means;

making the device from any metal or synthetic material and by any forming process: molding, folding, bending, cutting, pressing, etc;

applying the invention to air inlet ducts and manifolds that may be of any shape or cross section.

The invention claimed is:

1. An exhaust gas recirculation device for an internal combustion engine, the recirculation device comprising, inside an air inlet duct which is followed by a manifold with numerous outlets, means for introducing recirculated exhaust gases creating a swirling flow of these gases so that they mix with admitted fresh air upstream of the inlet of the manifold, the exhaust gas recirculation device being designed to inject the exhaust gases such that they form two adjacent contrarotating swirling vortexes which self-sustain as far as the outlets of the manifold, wherein the exhaust gas recirculation device comprises a double tubular mixing nozzle in the form of two oblong tubular nozzles positioned side by side and symmetrically inside the air inlet duct, said two tubular nozzles being arranged such that the exhaust gases form said two adjacent contrarotating swirling vortexes inside the two tubular nozzles while the exhaust gases flow inside the two oblong tubular nozzles, and wherein the exhaust gas recirculation device further includes a single exhaust gas carrying pipe common to the two tubular nozzles, said exhaust gas carrying pipe being situated in the plane of symmetry of the two tubular nozzles.

2. The exhaust gas recirculation device as claimed in claim 1, wherein the double tubular mixing nozzle is in direct communication with said exhaust gas carrying pipe, said exhaust gas carrying pipe being positioned tangentially with respect to the two tubular nozzles.

3. The exhaust gas recirculation device as claimed in claim 2, wherein the two tubular nozzles are mutually parallel and are parallel to a central axis of the air inlet duct.

4. The exhaust gas recirculation device as claimed in claim 2, wherein the two tubular nozzles have divergent axes that also form an angle with a central axis of the air inlet duct.

5. The exhaust gas recirculation device as claimed in claim 1, wherein the exhaust gas carrying pipe is of one piece with the double tubular mixing nozzle.

6. The exhaust gas recirculation device as claimed in claim 5, wherein said one piece is fixed by means of an annular fixing skirt connecting the exhaust gas carrying pipe to the exterior wall of the air inlet duct.

7. The exhaust gas recirculation device as claimed claim 1, wherein the two tubular nozzles are each the result of a respective deflecting wall which is substantially semi-cylindrical, said deflecting walls being positioned facing a mouth of the exhaust gas carrying pipe.

8. The exhaust gas recirculation device as claimed in claim 7, wherein said deflecting walls are attached to one another but unattached to the exhaust gas carrying pipe, and wherein said deflecting walls are connected to an interior wall of the air inlet duct by means of fixing lugs.

9. The exhaust gas recirculation device as claimed in claim 8, wherein the fixing lugs, of which there are two or three, comprise on exterior edge retaining claws designed to cling to said interior wall.

10. The exhaust gas recirculation device as claimed in claim 7, wherein said deflecting walls come from one and the same bent and folded sheet.

11. The exhaust gas recirculation device as claimed in claim 8, wherein the assembly comprising said deflecting walls and the fixing lugs is produced from one and the same bent and folded sheet.

12. The exhaust gas recirculation device as claimed in claim 11, wherein said assembly is mounted under effect of elastic stress to which said assembly is subjected, said elastic stress fixes said assembly inside the air inlet duct.

* * * * *